Oct. 25, 1955   S. ROBERTS ET AL   2,721,808
ELECTROLUMINESCENT CELL
Filed Nov. 14, 1951
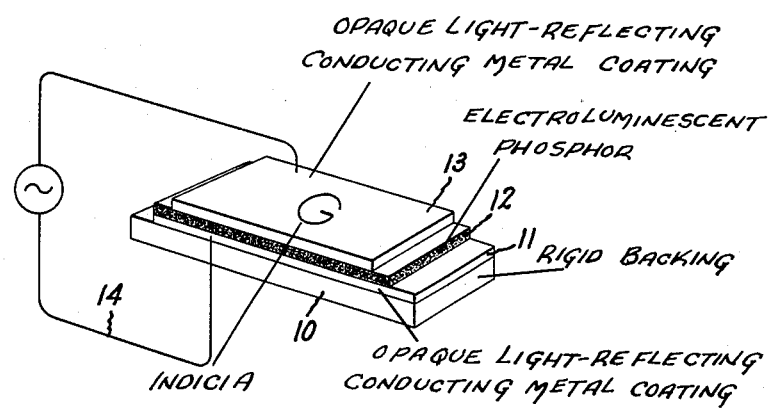
Inventors:
Shepard Roberts,
Ferd E. Williams,
by Paul A. Frank
Their Attorney.

United States Patent Office 2,721,808
Patented Oct. 25, 1955

2,721,808

ELECTROLUMINESCENT CELL

Shepard Roberts, Scotia, and Ferd E. Williams, Schenectady, N. Y., assignors to General Electric Company, a corporation of New York Application November 14, 1951, Serial No. 256,312

5 Claims. (Cl. 117—8)

This invention relates to an electroluminescent cell or luminous capacitor of a type particularly suitable as a clock face or instrument panel. More particularly, the invention relates to means whereby indicia may be produced on an electroluminescent cell.

An electroluminescent cell, or luminous capacitor as it is sometimes called, is a light-emitting device made after the manner of a flat plate capacitor, except that one of the plates is made of a transparent conducting material such as tin oxide and the space between the plates is occupied by a thin layer of dielectric material in which a phosphor such as zinc sulfide is suspended. When such a device is energized by an alternating current, the phosphor emits light which is visible through the transparent conducting layer. The intensity of the light increases as the voltage and frequency of the alternating current increases.

While the light produced does not have nearly the brightness of an incandescent light or a fluorescent light, its surface may be increased to a very large area in order to compensate for the lack of intensity. An electroluminescent cell provides a very satisfactory source of light for clock faces, instrument dials and similar equipment.

It is an object of this invention to provide an electroluminescent cell having a layer of opaque conducting material which may be easily formed into a predetermined pattern.

It is a further object of this invention to provide a method of producing an electroluminescent cell which may be easily utilized as a clock face or instrument dial.

Briefly stated, in accordance with one embodiment of our invention, an electroluminescent cell utilizable as a clock face or instrument dial is produced from a rigid base, preferably of conducting material, which has been coated with an electroluminescent phosphor such as zinc sulfide which may be suspended in a dielectric material. A very thin layer of opaque conducting material is placed over the phosphor layer. A portion of this thin layer is then removed in accordance with a predetermined pattern which may be in the form of a clock face or instrument dial. The subsequent energizing of the cell results in light being cast through the thin layer in accordance with the pattern.

Referring to the accompanying drawing, which illustrates one embodiment of our invention, a base 10 has a layer 11 of conducting material on top thereof. The principal purpose of the base 10 is to provide rigidity for the structure. However, this rigidity may be provided by the conductor 11 in which event the base 10 may be omitted. If the base 10 is used, the conductor 11 may be a very thin surface applied on the base 10. For instance, the conducting surface 11 could be applied by evaporating aluminum upon the base 10 or by brushing or spraying a thin film of silver paste. Such evaporated, brushed or sprayed metal surfaces are, of course, both electrically conductive and light reflecting.

Overlying the conducting layer 11 is a phosphor layer 12. A suitable phosphor for this purpose is zinc sulfide activated with a small quantity of copper or silver. We prefer to suspend the phosphor in a dielectric plastic such as an alkyd resin which may contain cellulose nitrate. Obviously, other phosphors and other dielectrics can serve as satisfactorily as those enumerated above.

A very thin layer 13 of conducting material overlies the phosphor layer 12. This layer is preferably a metal, such as aluminum, tin, silver, gold, or copper which is evaporated onto the phosphor layer 12. Such evaporated layers are, of course, both electrically conductive and light reflecting. Conducting layers of metals other than those enumerated above may be equally satisfactory, the principal requirement being that the material be of a nature not easily susceptible to tarnishing or corrosion.

For illustrative purposes the thickness of the conducting and dielectric layers has been exaggerated in the drawing. Actually these layers may be less than a few thousandths of an inch in thickness.

The thin coating 13 of an electroluminescent cell constructed as described above may readily have a portion of its metal removed in accordance with a predetermined pattern, as indicated by the indicia shown on the layer 13. This may be accomplished by acid etching, scratching, or by cutting. The layer 13 may be etched through to show the indicia or to show the background, whichever is desirable.

When the conducting layers 11 and 13 of our electroluminescent cell are connected in an alternating current circuit 14, as shown in the drawing, the phosphor 12 emits light which clearly outlines the indicia cut through the layer 13. A cell of this type has applications for decorative purposes in addition to being useful for illuminated instrument panels and clock faces. A portion of the conducting layers 11 and 13 may be exposed in order to provide positions for the connection of terminals (not shown).

The electroluminescent cells presently known utilize a transparent conducting layer for the light to shine through. Since both conducting layers are opaque in our cell, the radiation density within the cell increases because of internal reflections. This results in an enhancement of the light radiated through the surface available. This effect is particularly pronounced in cells in which the suspending medium has the same index of refraction as the phosphor powder, and in cells made of continuous phosphors of the single-crystal type and the transparent-film type.

While the present invention has been described with reference to a particular embodiment thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. An electroluminescent cell comprising a rigid plate having an opaque light-reflecting and electrically-conductive metal surface providing one electrode of the cell, a layer of electroluminescent phosphor material overlying at least a portion of said metal surface, and a thin opaque light-reflecting and electrically-conductive metal coating overlying at least a portion of said phosphor layer and forming a second electrode of the cell, said thin metal coating having bounded areas removed to expose a portion of said phosphor layer in the form of indicia while leaving a substantial portion of said thin metal layer as the second electrode which cooperates with said one electrode to impress a voltage across the interposed phosphor whereby electroluminescent light generated by the phosphor layer portions between said opaque metal surface and opaque metal coating is intensified by internal reflections between said metal surface and coating and is transmitted by said phosphor layer to be emitted through the removed areas bounded by said metal coating.

2. The electroluminescent cell of claim 1 wherein said layer of electroluminescent phosphor material comprises a continuous transparent electroluminescent film.

3. The electroluminescent cell of claim 1 wherein the layer of electroluminescent phosphor material comprises a continuous phosphor of the single crystal type.

4. The electroluminescent cell of claim 1 wherein said layer of electroluminescent phosphor material comprises an electroluminescent phosphor powder suspended in a light transmitting dielectric medium.

5. The electroluminescent cell of claim 4 wherein the dielectric medium has substantially the same index of refraction as the phosphor powder.

References Cited in the file of this patent

UNITED STATES PATENTS

| | | |
|---|---|---|
| 1,560,103 | Schmierer | Nov. 3, 1925 |
| 1,994,483 | Ott | Mar. 19, 1935 |
| 2,456,376 | Chirelstein | Dec. 14, 1948 |
| 2,566,349 | Mager | Sept. 4, 1951 |